(12) United States Patent
Lien

(10) Patent No.: US 9,749,210 B2
(45) Date of Patent: Aug. 29, 2017

(54) METHOD FOR MEASURING NETWORK THROUGHPUT

(71) Applicant: Sercomm Corporation, Taipei (TW)

(72) Inventor: Chia-Hao Lien, Taipei (TW)

(73) Assignee: SERCOMM CORPORATION, Taipei (TW)

( * ) Notice: Subject to any disclaimer, the term of this patent is extended or adjusted under 35 U.S.C. 154(b) by 262 days.

(21) Appl. No.: 14/467,159

(22) Filed: Aug. 25, 2014

(65) Prior Publication Data

US 2015/0117251 A1  Apr. 30, 2015

(30) Foreign Application Priority Data

Oct. 25, 2013  (TW) .............................. 102138724 A

(51) Int. Cl.
| | | |
|---|---|---|
| H04L 12/26 | (2006.01) | |
| H04L 29/08 | (2006.01) | |
| H04L 7/00 | (2006.01) | |
| H04J 3/06 | (2006.01) | |

(52) U.S. Cl.
CPC ........ H04L 43/0888 (2013.01); H04J 3/0667 (2013.01); *H04L 67/1095* (2013.01)

(58) Field of Classification Search
CPC ........ H04L 43/0888; H04L 7/00; H04L 67/06
See application file for complete search history.

(56) References Cited

U.S. PATENT DOCUMENTS

| | | | |
|---|---|---|---|
| 8,625,443 B2 | 1/2014 | Bae | |
| 2002/0191573 A1* | 12/2002 | Whitehill | .............. H04L 1/0002 370/338 |
| 2003/0018450 A1* | 1/2003 | Carley | .................. H04L 41/142 702/179 |
| 2004/0086058 A1* | 5/2004 | Eckhardt | ................. H04L 25/05 375/295 |
| 2007/0028026 A1 | 2/2007 | Yeh et al. | |
| 2009/0252134 A1* | 10/2009 | Schlicht | ................ H04L 1/0015 370/338 |

(Continued)

FOREIGN PATENT DOCUMENTS

| | | |
|---|---|---|
| CN | 1905412 A | 1/2007 |
| CN | 101978621 | 2/2011 |

OTHER PUBLICATIONS

Weibel,Technology Update on IEEE 1588: The Second Edition of the High Precision Clock Synchronization Protocol , 2009, Zurich University of Applied Sciences.*

(Continued)

*Primary Examiner* — Mohammad Adhami
*Assistant Examiner* — Shailendra Kumar
(74) *Attorney, Agent, or Firm* — McClure, Qualey & Rodack, LLP

(57) ABSTRACT

A method for measuring network throughput is provided. The method comprises the following steps: exchanging messages with a time synchronization protocol server in compliance with a time synchronization protocol, synchronizing a slave clock with a master clock of the time synchronization protocol server according to time information related to the messages, and calculating at least one network throughput according to the time information and size information related to the messages.

10 Claims, 3 Drawing Sheets

(56) References Cited

U.S. PATENT DOCUMENTS

2011/0007660 A1* 1/2011 Bae .................. H04L 1/0002
370/252
2012/0177038 A1* 7/2012 Dai .................. H04L 12/184
370/390
2013/0132554 A1 5/2013 Armbruster

OTHER PUBLICATIONS

Hans Weibel: "The Second Edition of the High Precision Clock Synchronization Protocol"; Technology Update on IEEE 1588; © 2009, Zurich University of Applied Sciences; pp. 1-8.
SIPO Office Action dated Mar. 21, 2016 in corresponding Chinese application (No. 201310512423.7).
"Automation of Electric Power Systems"; IEEE 1588; vol. 33, No. 13, Jul. 10, 2009; pp. 99-103.
SIPO Office Action dated Oct. 28, 2016 in Chinese application (No. 201310512423.7).
TIPO Office Action dated Nov. 17, 2016 in Taiwan application (No. 102138724).
"Automation of Electric Power Systems"; IEEE 1588; vol. 33, No. 13, Jul. 10, 2009; pp. 1-3.

* cited by examiner

METHOD FOR MEASURING NETWORK THROUGHPUT

This application claims the benefit of Taiwan application Serial No. 102138724, filed Oct. 25, 2013, the subject matter of which is incorporated herein by reference.

BACKGROUND

Field of the Invention

The disclosure relates in general to a method for measuring, and more particularly to a method for measuring network throughput.

Related Art

The quality of network service is heavily influenced by the network throughput. Conventionally there are several methods to measure the network throughput. One of the methods, for example, is to set up a file transfer protocol (FTP) server to transmit data in order to measure the network throughput. However, most conventional methods generate unnecessary extra data flow and additionally occupy the network bandwidth. Thus there is a need for a method for measuring network throughput without generating extra data flow or setting up an extra server.

SUMMARY

The disclosure is directed to a method for measuring network throughput.

According to one aspect of the invention, a method for measuring network throughput is provided. The method comprises the following steps: exchanging messages with a time synchronization protocol server in compliance with a time synchronization protocol, synchronizing a slave clock with a master clock of the time synchronization protocol server according to time information related to the messages, and calculating at least one network throughput according to the time information and size information related to the messages.

According to another aspect of the invention, a method for measuring network throughput is provided. The method comprises the following steps: exchanging messages with a time synchronization protocol slave device in compliance with a time synchronization protocol, and calculating at least one network throughput according to time information and size information related to the messages.

The invention will become apparent from the following detailed description of the preferred but non-limiting embodiments. The following description is made with reference to the accompanying drawings.

Figure 1:
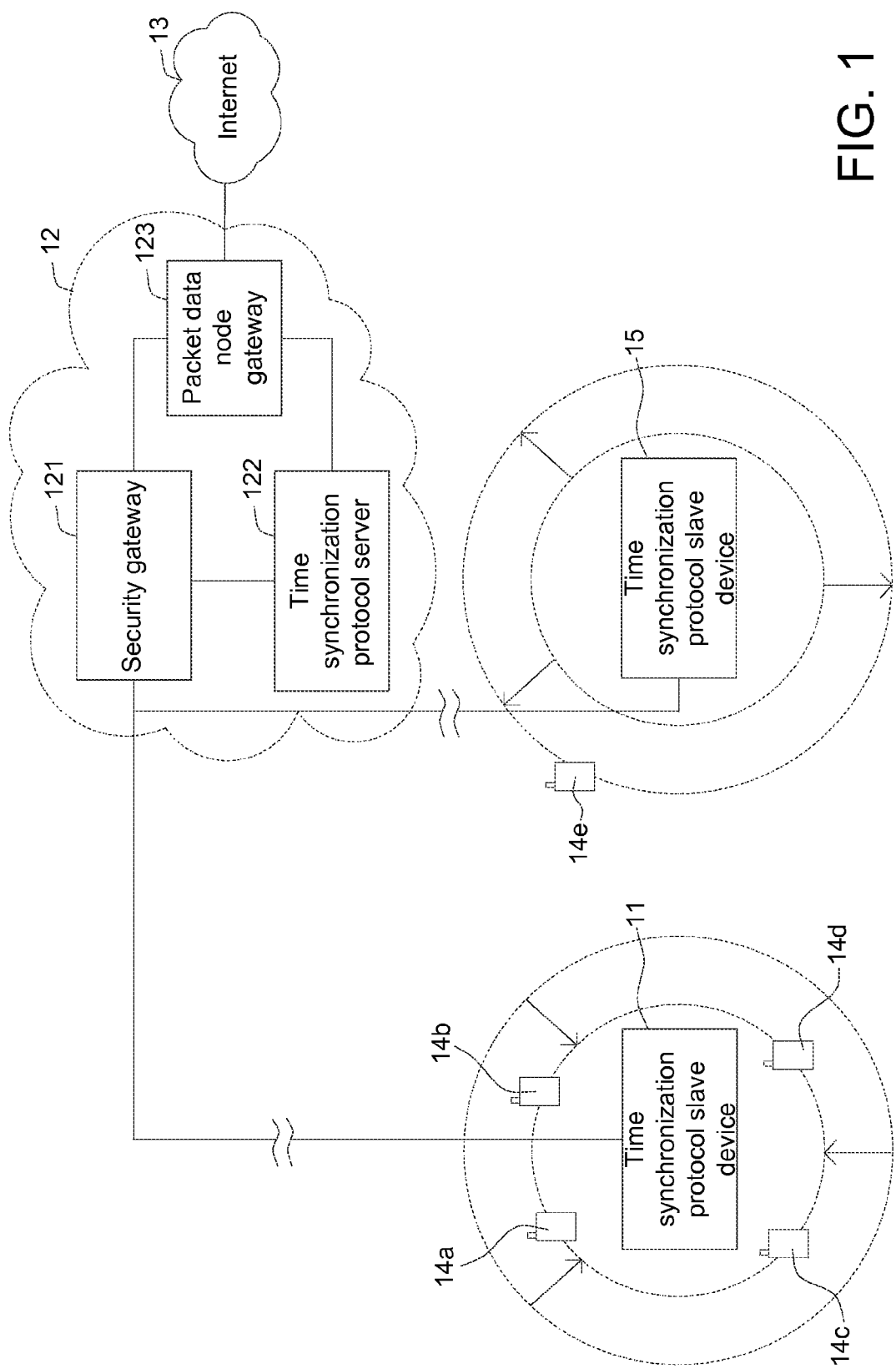
FIG. 1 shows a diagram of the time synchronization protocol slave devices, the core network and the Internet.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The First Embodiment

Please refer to FIG. 1. FIG. 1 shows a diagram of the time synchronization protocol slave devices, the core network and the Internet. The core network 12 is connected to the time synchronization protocol slave device 11 and the Internet 13. The time synchronization protocol slave device 11 may be for example a femtocell or a passive optical network (PON) device. The core network 12 includes a security gateway (SeGW) 121, a time synchronization protocol server 122 and a packet data node gateway (PGW) 123. The time synchronization protocol slave device 11 and the time synchronization protocol server 122 are connected to the SeGW 121. In addition, the time synchronization protocol slave device 11 and the time synchronization protocol server 122 are connected to the Internet 13 through the PGW 123. Please note that the term "connect" in this disclosure may refer to "connect directly" or "connect indirectly."

The time synchronization protocol may be Precision Time Protocol (PTP), Network Time Protocol (NTP), or other available time synchronization protocols. This kind of protocols enables a slave device to synchronize its slave clock with a master clock of a master device. The following paragraphs will use PTP as an exemplary time synchronization protocol to help understand the concepts of the invention.

Figure 2:
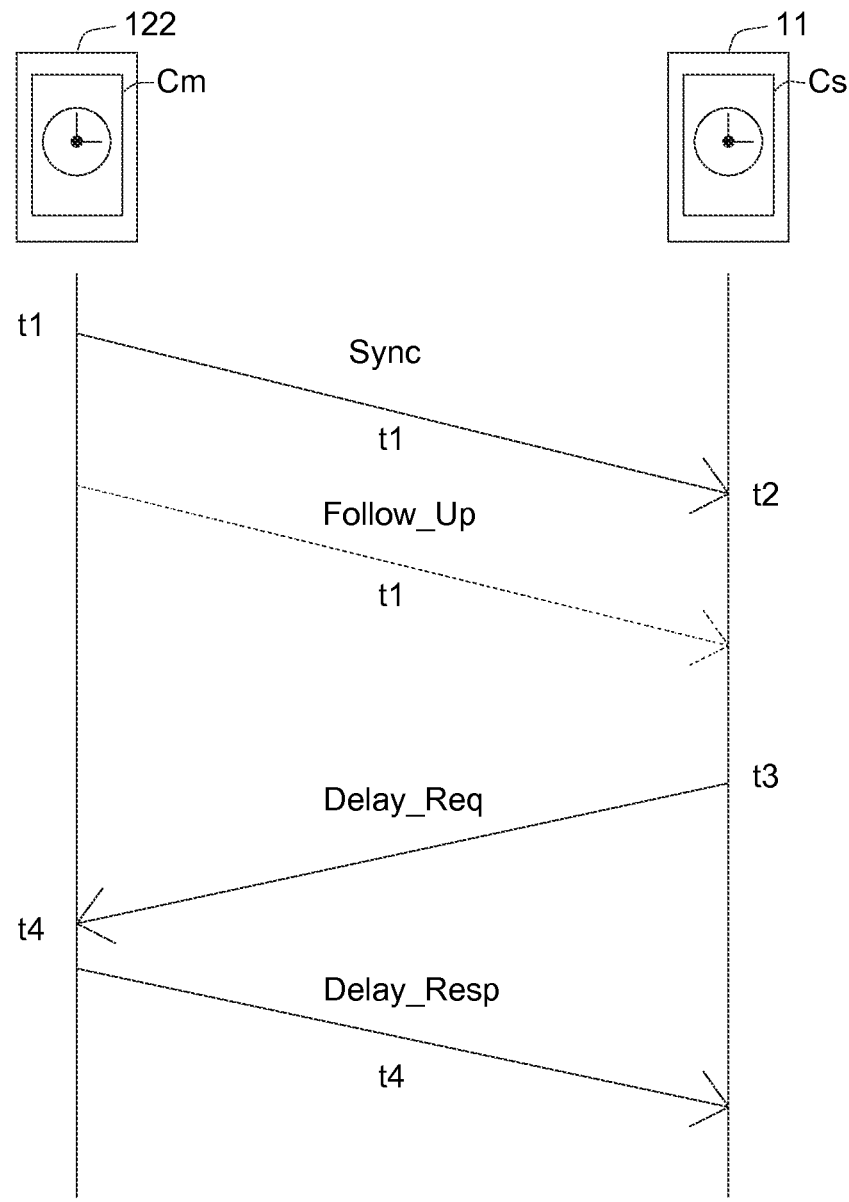
FIG. 2 shows a diagram of messages exchanged between the time synchronization protocol server and the time synchronization protocol slave device.
Figure 3:
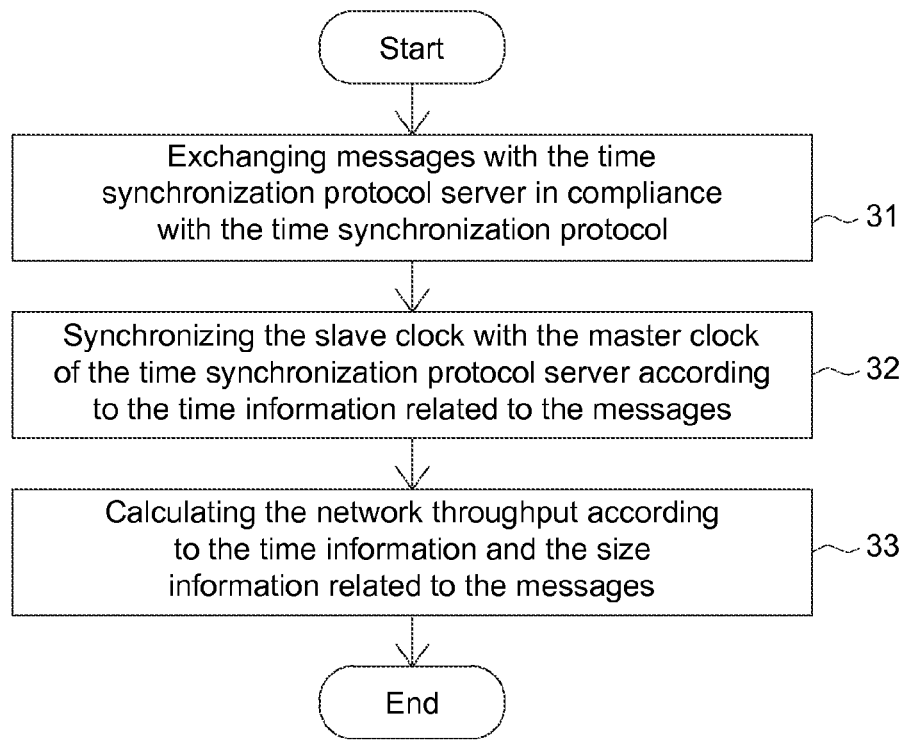
FIG. 3 shows a flowchart of the method for measuring network throughput executed by the time synchronization protocol slave device.

Please refer to FIG. 2 and FIG. 3. FIG. 2 shows a diagram of messages exchanged between the time synchronization protocol server and the time synchronization protocol slave device. FIG. 3 shows a flowchart of the method for measuring network throughput executed by the time synchronization protocol slave device. First, as shown in step 31, the time synchronization protocol slave device 11 exchanges messages with the time synchronization protocol server 122 in compliance with the time synchronization protocol. The messages exchanged may be for example a synchronization packet Sync, a follow up packet Follow_Up, a delay request packet Delay_Req, and a delay response packet Delay_Resp. The step 31 may include multiple instances of the message exchange shown in FIG. 2. Next, as shown in step 32, the time synchronization protocol slave device 11 synchronizes the slave clock Cs with the master clock Cm of the time synchronization protocol server 122 according to the time information related to the messages. The time of the slave clock Cs is adjusted to be the same as or to be very close to the time of the master clock Cm. Then, as shown in step 33, the time synchronization protocol slave device 11 calculates the network throughput according to the time information and the size information related to the messages.

Specifically, in order to synchronize the slave clock Cs with the master clock Cm, the time synchronization protocol slave device 11 exchanges messages with the time synchronization protocol server 122. The messages exchanged include a synchronization packet Sync, a follow up packet Follow_Up, a delay request packet Delay_Req, and a delay response packet Delay_Resp. First, the time synchronization protocol server 122 sends a synchronization packet Sync at time t1, and the time synchronization protocol slave device 11 receives the sync packet Sync at time t2. The time synchronization protocol server 122 may also send a follow up packet Follow_Up after sending the synchronization packet Sync. The synchronization packet Sync and the follow up packet Follow_Up may include a timestamp recording the time t1.

Next, the time synchronization protocol slave device 11 sends a delay request packet Delay_Req at time t3, and the time synchronization protocol server 122 receives the delay request packet Delay_Req at time t4. After the time synchronization protocol server 122 receives the delay request packet Delay_Req at time t4, the time synchronization protocol server 122 sends a delay response packet Delay_Resp to the time synchronization protocol slave device 11 in response. The delay response packet Delay_Resp may include a timestamp recording the time t1 and t4. The synchronization packet Sync, the follow up packet Follow_Up, the delay request packet Delay_Req, and the delay response packet Delay_Resp are exchanged from time to time between the time synchronization protocol slave device 11 and the time synchronization protocol server 122 in order to synchronize the slave clock Cs with the master clock Cm.

Furthermore, the time synchronization protocol slave device 11 is able to calculate the network downlink throughput according to the time information and the size information of the received messages (the one or more time synchronization protocol messages that the time synchronization protocol slave device 11 receives from the time synchronization protocol server 122). The received messages of the time synchronization protocol slave device 11 may include the synchronization packet Sync, the follow up packet Follow_Up, and the delay response packet Delay_Resp. Take the synchronization packet Sync for example, the time information of the received message refers to the time t1 at which the synchronization packet Sync is sent and the time t2 at which the synchronization packet Sync is received. The size information of the received message refers to the packet size of the synchronization packet Sync. The transmission time of the synchronization packet Sync DS=t2−t1. The time synchronization protocol slave device 11 calculates the network downlink throughput DBW according to the transmission time DS and the packet size SPZ of the synchronization packet Sync. The network downlink throughput DBW=SPZ/DS.

In order to improve precision and to reduce the misjudgment caused by instantaneous packet burst, calculation of the network downlink throughput DBW can be performed after accumulating N valid samples, in which samples with excessive variation are eliminated. For example, the network downlink throughput $$DBW = \frac{\sum_{i=1}^{N} SPZ(i)}{\sum_{i=1}^{N} DS(i)}.$$

Wherein SPZ(i) represents the size of the $i_{th}$ received packet that is counted, DS(i) represents the transmission time of the $i_{th}$ received packet that is counted, and N may be greater than or equal to 100.

Similarly, the time synchronization protocol slave device 11 is able to calculate the network uplink throughput according to the time information and the size information of the transmitted messages (the one or more time synchronization protocol messages that the time synchronization protocol slave device 11 sends to the time synchronization protocol server 122). The transmitted message of the time synchronization protocol slave device 11 may be for example the delay request packet Delay_Req. The time information of the transmitted message refers to the time t3 at which the delay request packet Delay_Req is sent and the time t4 at which the delay request packet Delay_Req is received. The size information of the transmitted message refers to the packet size of the delay request packet Delay_Req.

The transmission time of the delay request packet Delay_Req DD=t4−t3. The time synchronization protocol slave device 11 calculates the network uplink throughput DBW according to the transmission time DD and the packet size DPZ of the delay request packet Delay_Req. The network uplink throughput UBW=DPZ/DD. In order to improve precision and to reduce the misjudgment caused by instantaneous packet burst, calculation of the network uplink throughput UBW can be performed after accumulating M valid samples, in which samples with excessive variation are eliminated. For example, the network uplink throughput $$UBW = \frac{\sum_{j=1}^{M} DPZ(j)}{\sum_{j=1}^{M} DD(j)}.$$

Wherein DPZ(j) represents the size of the $j_{th}$ transmitted packet that is counted, DD(j) represents the transmission time of the $j_{th}$ transmitted packet that is counted, and M may be greater than or equal to 100.

After calculating the network uplink/downlink throughput, the time synchronization protocol slave device 11 may adjust its radio frequency transmission power dynamically according to the network throughput. For example, suppose the downlink throughput between the time synchronization protocol server 122 and the time synchronization protocol slave device 11 is 4 Mbps, mobile phones 14a, 14b, 14c and 14d have been connected to the Internet through the time synchronization protocol slave device 11, and the downlink throughput used by each of the mobile phones 14a, 14b, 14c and 14d is 1 Mbps. In that case the downlink throughput is no longer abundant. In response, the time synchronization protocol slave device 11 may reduce its transmission power in order to prevent the network congestion problem caused by another mobile phone trying to be connected to the Internet through the time synchronization protocol slave device 11.

The Second Embodiment

Figure 4:
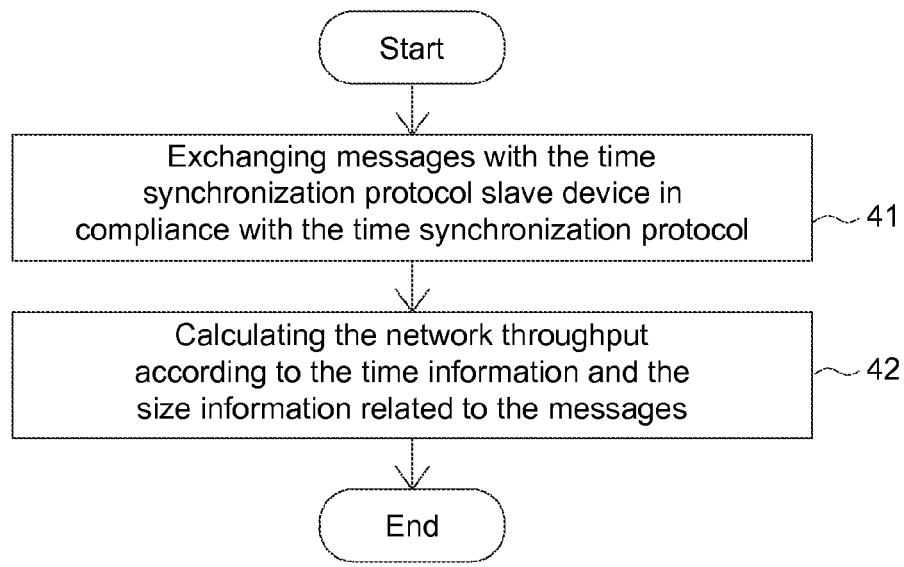
FIG. 4 shows a flowchart of the method for measuring network throughput executed by the time synchronization protocol server.

Please refer to FIG. 2 and FIG. 4. FIG. 4 shows a flowchart of the method for measuring network throughput executed by the time synchronization protocol server. First, as shown in step 41, the time synchronization protocol server 122 exchanges messages with the time synchronization protocol slave device 11 in compliance with the time synchronization protocol. Step 41 is to help the time synchronization protocol slave device 11 adjust its slave clock Cs. The time synchronization protocol server 122 does not have to adjust its master clock Cm in step 41. Next, as shown in step 42, the time synchronization protocol server 122 calculates the network throughput according to the time information and the size information related to the messages.

The time synchronization protocol server 122 may inform the time synchronization protocol slave device 11 to adjust its transmission power according to the network throughput. For example, suppose the downlink throughput between the time synchronization protocol server 122 and the time synchronization protocol slave device 11 is 4 Mbps, mobile phones 14a, 14b, 14c and 14d have been connected to the Internet through the time synchronization protocol slave device 11, and the downlink throughput used by each of the mobile phones 14a, 14b, 14c and 14d is 1 Mbps. In that case the time synchronization protocol server 122 may inform the time synchronization protocol slave device 11 to reduce its transmission power. In addition, the time synchronization protocol server 122 may also inform a time synchronization protocol slave device 15 that is close to the time synchronization protocol slave device 11 to increase its transmission power. Therefore a mobile phone 14e can be connected to the Internet through the time synchronization protocol slave device 15 which is less congested, and a better network service quality can be provided.

The time synchronization protocol server 122 is able to calculate the network downlink throughput according to the time information and the size information of the transmitted messages (the one or more time synchronization protocol messages that the time synchronization protocol server 122 sends to the time synchronization protocol slave device 11). The transmitted messages may include the synchronization packet Sync, the follow up packet Follow_Up, and the delay response packet Delay_Resp. Take the synchronization packet Sync for example, the time information of the transmitted message refers to the time t1 at which the synchronization packet Sync is sent and the time t2 at which the synchronization packet Sync is received. The size information of the transmitted message refers to the packet size of the synchronization packet Sync. The transmission time of the synchronization packet Sync DS=t2−t1. The time synchronization protocol server 122 calculates the network downlink throughput DBW according to the transmission time DS and the packet size SPZ of the synchronization packet Sync. The network downlink throughput DBW=SPZ/DS.

In order to improve precision and to reduce the misjudgment caused by instantaneous packet burst, calculation of the network downlink throughput DBW can be performed after accumulating P valid samples, in which samples with excessive variation are eliminated. For example, the network downlink throughput $$DBW = \frac{\sum_{k=1}^{P} SPZ(k)}{\sum_{k=1}^{P} DS(k)}.$$

Wherein SPZ(k) represents the size of the $k_{th}$ received packet that is counted, DS(k) represents the transmission time of the $k_{th}$ received packet that is counted, and P may be greater than or equal to 100.

Similarly, the time synchronization protocol server 122 is able to calculate the network uplink throughput according to the time information and the size information of the received messages (the one or more time synchronization protocol messages that the time synchronization protocol server 122 receives from the time synchronization protocol slave device 11). The received message of the time synchronization protocol server 122 may be for example the delay request packet Delay_Req. The time information of the received message refers to the time t3 at which the delay request packet Delay_Req is sent and the time t4 at which the delay request packet Delay_Req is received. The size information of the received message refers to the packet size of the delay request packet Delay_Req.

The transmission time of the delay request packet Delay_Req DD=t4−t3. The time synchronization protocol server 122 calculates the network uplink throughput UBW according to the transmission time DD and the packet size DPZ of the delay request packet Delay_Req. The network uplink throughput UBW=DPZ/DD.

In order to improve precision and to reduce the misjudgment caused by instantaneous packet burst, calculation of the network uplink throughput UBW can be performed after accumulating Q valid samples, in which samples with excessive variation are eliminated. For example, the network uplink throughput $$UBW = \frac{\sum_{l=1}^{Q} DPZ(l)}{\sum_{l=1}^{Q} DD(l)}.$$

Wherein DPZ(l) represents the size of the lth transmitted packet that is counted, DD(l) represents the transmission time of the lth transmitted packet that is counted, and Q may be greater than or equal to 100.

Similar to that described above, the time synchronization protocol server 122 may inform the time synchronization protocol slave device 11 to adjust its transmission power according to the network throughput.

According to the method for measuring network throughput disclosed herein, the network throughput between a time synchronization protocol server and a time synchronization protocol slave device can be calculated in real time by exchanging messages of the time synchronization protocol. Hence there is no need for setting up an extra FTP server to transmit data. In addition, the messages exchanged are in compliance with the time synchronization protocol, and therefore the packets used are inherent in the time synchronization protocol. Consequently, the network throughput can be dynamically calculated without occupying extra network bandwidth.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method at a time synchronization protocol slave device, the method comprising:
   exchanging a plurality of messages with a time synchronization protocol server in compliance with a time synchronization protocol;
   synchronizing a slave clock with a master clock of the time synchronization protocol server according to time information related to the plurality of messages;
   calculating at least one network throughput according to the time information and size information related to the plurality of messages; and reducing a radio frequency transmission power when the at least one network throughput is insufficient.

2. The method according to claim 1, wherein the step of calculating the at least one network throughput according to the time information and the size information related to the plurality of messages comprises:

calculating a network downlink throughput according to time information and size information related to a plurality of received messages of the plurality of messages, wherein the plurality of received messages comprise at least 100 received messages.

3. The method according to claim 1, wherein the step of calculating the at least one network throughput according to the time information and the size information related to the plurality of messages comprises:

calculating a network uplink throughput according to time information and size information related to a plurality of transmitted messages of the plurality of messages, wherein the plurality of transmitted messages comprise at least 100 transmitted messages.

4. The method according to claim 1, wherein the method is executed by a femtocell or a passive optical network device.

5. The method according to claim 1, wherein the time synchronization protocol is Precision Time Protocol or Network Time Protocol.

6. A method at a time synchronization protocol server, the method comprising:

exchanging a plurality of messages with a time synchronization protocol slave device in compliance with a time synchronization protocol;

calculating at least one network throughput according to time information and size information related to the plurality of messages; and informing the time synchronization protocol slave device to reduce a radio frequency transmission power of the time synchronization protocol slave device when the at least one network throughput is insufficient.

7. The method according to claim 6, wherein the step of calculating the at least one network throughput according to the time information and the size information related to the plurality of messages comprises:

calculating a network downlink throughput according to time information and size information related to a plurality of transmitted messages of the plurality of messages, wherein the plurality of transmitted messages comprise at least 100 transmitted messages.

8. The method according to claim 6, wherein the step of calculating the at least one network throughput according to the time information and the size information related to the plurality of messages comprises:

calculating a network uplink throughput according to time information and size information related to a plurality of received messages of the plurality of messages, wherein the plurality of received messages comprise at least 100 received messages.

9. The method according to claim 6, wherein the time synchronization protocol slave device is a femtocell or a passive optical network device.

10. The method according to claim 6, wherein the time synchronization protocol is Precision Time Protocol or Network Time Protocol.

* * * * *